(Model.)
J. HUNT.
METHOD OF AND APPARATUS FOR BOTTLING BEER, &c.
No. 301,598. Patented July 8, 1884.
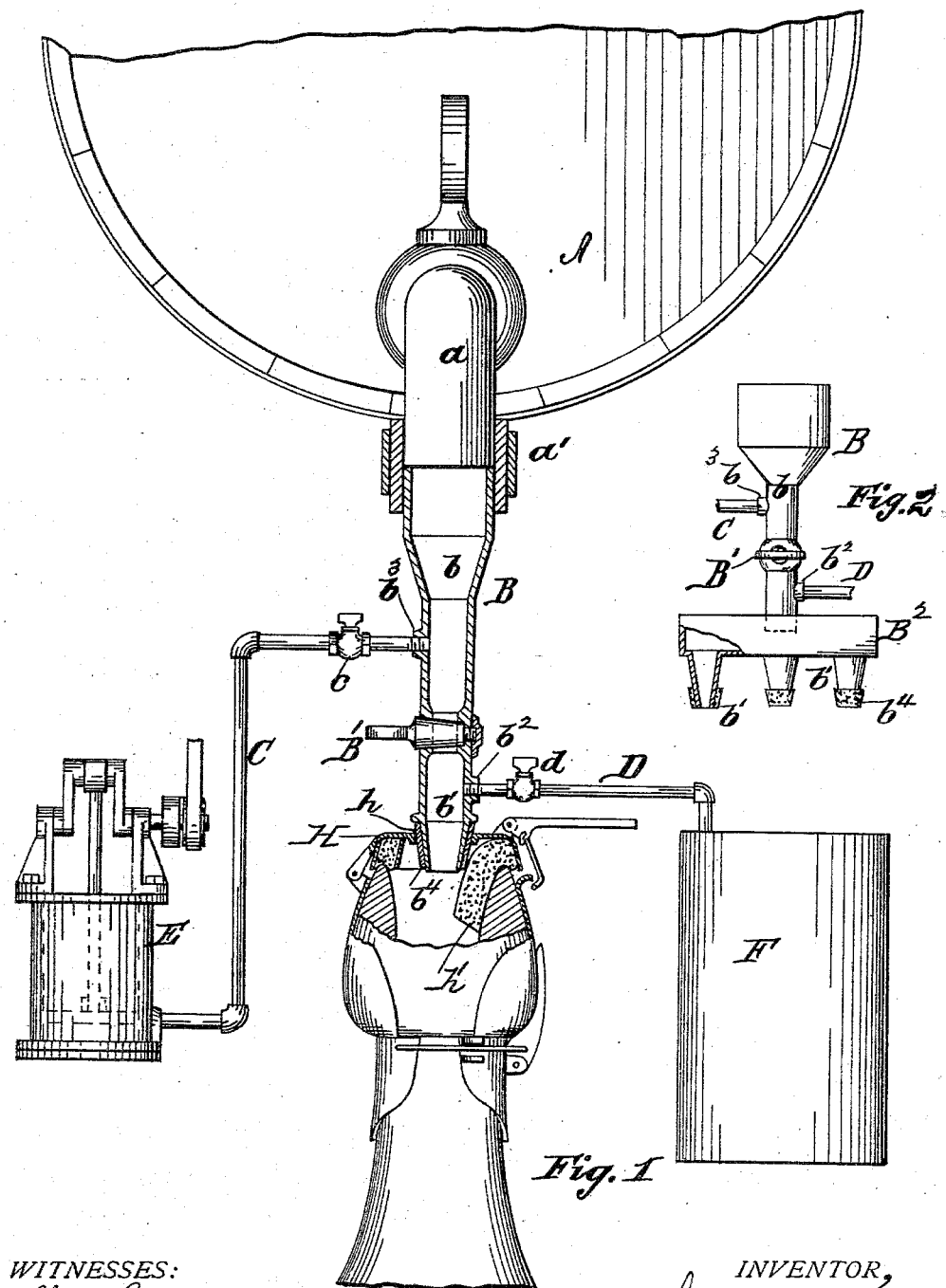
WITNESSES:
Albert Lupton
Wm. McCombs
INVENTOR,
James Hunt

UNITED STATES PATENT OFFICE.

JAMES HUNT, OF PHILADELPHIA, PA., ASSIGNOR OF TWO-THIRDS TO ANTHONY R. FINCK AND ROBERT H. MITCHELL, BOTH OF SAME PLACE.

METHOD OF AND APPARATUS FOR BOTTLING BEER, &c.

SPECIFICATION forming part of Letters Patent No. 301,598, dated July 8, 1884.

Application filed May 17, 1881. (Model.)

*To all whom it may concern:*

Be it known that I, JAMES HUNT, a citizen of the United States, residing in the city of Philadelphia, in the county of Philadelphia and State of Pennsylvania, have invented certain new and useful Improvements in the Method of and Apparatus for Bottling Beer and other Liquors, of which the following is a specification, reference being had to the accompanying drawings, wherein—

Figure 1 is an elevation, partly in section, of apparatus embodying my invention; and Fig. 2 is an elevation, partly in section, of the multiple filling device.

My invention has relation to a new method of and apparatus for bottling beer and other liquors, whereby when the beer is bottled it loses none of its strength, retains the purity of its flavor, and is rendered more lively and agreeable to the taste than is the case with beer bottled by the processes heretofore practiced.

In the method of bottling beer now generally used the liquid is simply conducted to and into the bottle, wherein it comes in contact with and displaces the air in said bottle, the result of which is that the beer foams or froths to such an extent that before the bottle is filled with such liquid the froth has overrun said vessel; consequently the latter is stood aside until the froth settles, when additional beer is introduced into the bottle until the latter is filled to its required extent. This mode of filling the bottle not only results in a loss of time and a waste of beer, but the latter in frothing parts with a portion of its strength. Another serious disadvantage of such method is that the frothing of the beer and its contact with the air in the bottle set up a fermentation in the beer, which often lasts for two or three days after the bottle has been stoppered, thereby resulting in the still further deterioration of the quality and strength of the bottled liquid, such fermentation converting a portion of the alcohol of the beer into vinegar, and thereby imparting to the beer an acid taste which is more or less noticeable in such bottled compounds.

My invention has for its object to provide a method of and apparatus for effecting the bottling of beer which will avoid the above-described effects and do away with said disadvantages, and which will at the same time preserve the original strength and flavor of the beer, and also make it more lively and agreeable to the taste. To this end I first exhaust the air from the bottle to be filled, so that when the beer passes therein it does so *in vacuo;* consequently no or very little frothing of the same takes place. There being no frothing, the strength of the beer is preserved and no fermentation occurs; consequently such bottled beer has no acidulous taste imparted to it, the original flavor of the beer being completely preserved. After the beer has passed into the bottle, I then charge or impregnate it with carbonic-acid gas, whereupon the bottle is then corked or stoppered and put away until required for use. The effect of the carbonic-acid gas is as follows: It prevents any fermentation of the beer in the bottle should there be a tendency to that end, besides which it renders the beer more lively and agreeable to the taste when drank.

The apparatus necessary for practicing my improved process consists of the novel combination and arrangement of parts, having reference, principally, to the provision of a filling device so constructed as to enter the stopper of the bottle and form an air-tight joint therewith, said filling device having valved pipe-connections with a tank or barrel, an air-pump or exhaust, and a carbonic-acid generator, as hereinafter more fully explained.

Referring to the accompanying drawings, A represents a vessel or keg for containing the beer or other liquid to be bottled, having a spigot, $a$, to the end of which, by means of a coupling, $a'$, is secured a filling device or reducer, B, consisting of a hollow body, $b$, and tapering nozzle $b'$, and valve B'. The body $b$ is provided with bosses $b^2$ $b^3$, one of which is placed below and the other above said valve B', said bosses having threaded openings which pass clear through the wall of said body, and into which are screwed pipes C D, which respectively connect with an air-pump or exhaust, E, and carbonic-acid-gas generator or gasometer F. Said pipes are also provided with valves $c$ and $d$, respectively.

The bottle to be filled is represented at G, having a stopper therefor. Any suitable form of stopper may be used; but I prefer the stopper H shown in the drawings, having an aperture, $h$, in its top, and provided with a valve, $h'$, which opens inwardly, as shown. I do not deem it necessary to further describe the construction and operation of said stopper, as I have embodied the same in a separate application for Letters Patent.

The operation is as follows: The bottle to be filled, being furnished with a proper stopple and placed in position thereon to close or hermetically seal same, is placed upon a suitable stand beneath the filling device B, so that the end of nozzle $b'$ will enter the opening in said stopper and push aside the valve covering said opening until it finds its seat upon the edge of the stopper-opening and forms an air-tight joint therewith. The cock $c$ in pipe C, leading to pump or exhaust E, is now opened, so, also, is the cock B' in filler B, whereupon the air in bottle G is withdrawn or exhausted, and said cock $c$ is then closed. The spigot $a$ is now opened, and beer in the vessel or keg A passes through filler B and enters bottle G. There being no air therein, or, if so, it is in an extremely rarefied condition, very little of the frothing occurs in said bottle; consequently the latter is at once filled to its required extent, and when so filled the spigot $a$ is turned off to stop the flow of the beer from keg A, and cock B' is also now closed, whereupon the cock $d$ in pipe D, leading to generator F, is opened, and the beer in bottle G is charged with carbonic-acid gas from said generator. When sufficiently impregnated with the gas, the cock $d$ is closed and valve B' is again opened, and the bottle is then lowered from the filler B. As the nozzle leaves the opening $h$, the valve in the stopper seats itself on the under side of said opening, and is held in such position by the pressure of gas within the bottle to prevent the escape of any of the contents thereof.

It will thus be seen that the beer is bottled without the loss of time or waste of the liquor. The strength and purity of flavor of said beer are preserved intact, and such liquors rendered more lively and agreeable to the taste by reason of the carbonic-acid impregnation.

I have shown the reducer or filling device B as being secured to the spigot of the beer-tank; but it is obvious that it need not be directly attached thereto, but may be connected to the same by a tube or flexible pipe. So, too, while I have described the reducer or filling device as being constructed to fill only one bottle at the time, it is apparent that it may be formed to fill a number of bottles at one and the same operation. This form is shown in Fig. 2, and may be called a "multiple" filling device, the body B² being enlarged, and may be made oblong, cylindrical, or of any other suitable configuration, and is common to and is provided with a series of nozzles, $b'$ $b'$, &c., the number of the latter depending on the number of bottles it is desired to fill at the same time. So, too, while I have shown a pump for exhausting the air from the vessels to be filled, I do not wish to be considered as confining myself thereto, as an exhaust-fan or any other suitable mechanism may be substituted for accomplishing the desired end.

In bottling some makes of beer it may be that no impregnation of carbonic-acid gas is desired. The latter may then be dispensed with, and the beer will be then bottled *in vacuo* only.

I have described my invention as being especially adapted to the bottling of beer; but it may be employed for bottling other liquors, such as ale, porter, wine, mineral water, &c. Where wine is bottled, the exhausting process may, if desired, be dispensed with, and the wine run into the bottles in the usual manner, and then charged with the carbonic-acid gas to produce a sparkling or effervescing wine.

If desired, the end of the nozzle $b'$ may be provided with a rubber or other equivalent ring, so that when the same is inserted in the stopper-opening an air-tight joint will be more readily formed between said parts.

In bottling mineral waters and such like liquids the same may be manufactured in the process of bottling instead of doing so before bottling, as heretofore necessary. For instance, the water and the amount of sirup may first be placed simultaneously or separately in the bottle and then be charged with carbonic-acid gas, and thus mineral water is manufactured in the act of bottling the same, and not mixing said ingredients together in one large tank or generator, and then bottling therefrom, as is now practiced.

While I have shown and described the forms of bottle-stoppers known as "external stoppers," I do not limit my invention thereto, as it is obvious that it can be used with equal facility in filling bottles provided with internal stoppers. In such case the filling device should be provided with a rod or wire for pushing down and keeping the stopper away from its seat during said operation.

What I claim as my invention is—

1. In bottling and barreling malt or fermentable liquors, the method of transferring such liquors from one receptacle to another without affecting the strength or purity of the liquors, which consists in first exhausting the air from the vessel into which the liquor is to be transferred, and then filling the liquor into said vessel thus exhausted of its air, and then sealing said vessel, substantially as set forth.

2. In bottling and barreling malt or fermentable liquors, the method of transferring such liquors from one receptacle to another and charging such liquors with an acid gas without affecting the strength or purity of the same, which consists in first exhausting the air from the vessel into which the liquor is to be transferred, then filling the liquor into said vessel thus exhausted of its air, and then charging or impregnating the liquor with carbonic-acid gas before sealing, substantially as set forth.

3. The filling device B, consisting of body $b$ and tapering nozzles $b'$, said body being provided with cocks $c$ and $d$, and having openings $b^2$ $b^3$, and a valve between said openings, substantially as and for the purpose set forth.

In testimony that I claim the foregoing I have hereunto set my hand this 6th day of May, 1881.

JAMES HUNT.

Witnesses:
BENNET C. WILSON,
ISAAC H. O'HARRA.